July 1, 1969     M. N. SCHWEIZER     3,453,598

CREDIT CARD VERIFIER USING TRANSFORMERS

Filed June 3, 1965     Sheet 1 of 3

INVENTOR
MAX NORMAN SCHWEIZER
BY Borot & Borot
ATTORNEYS

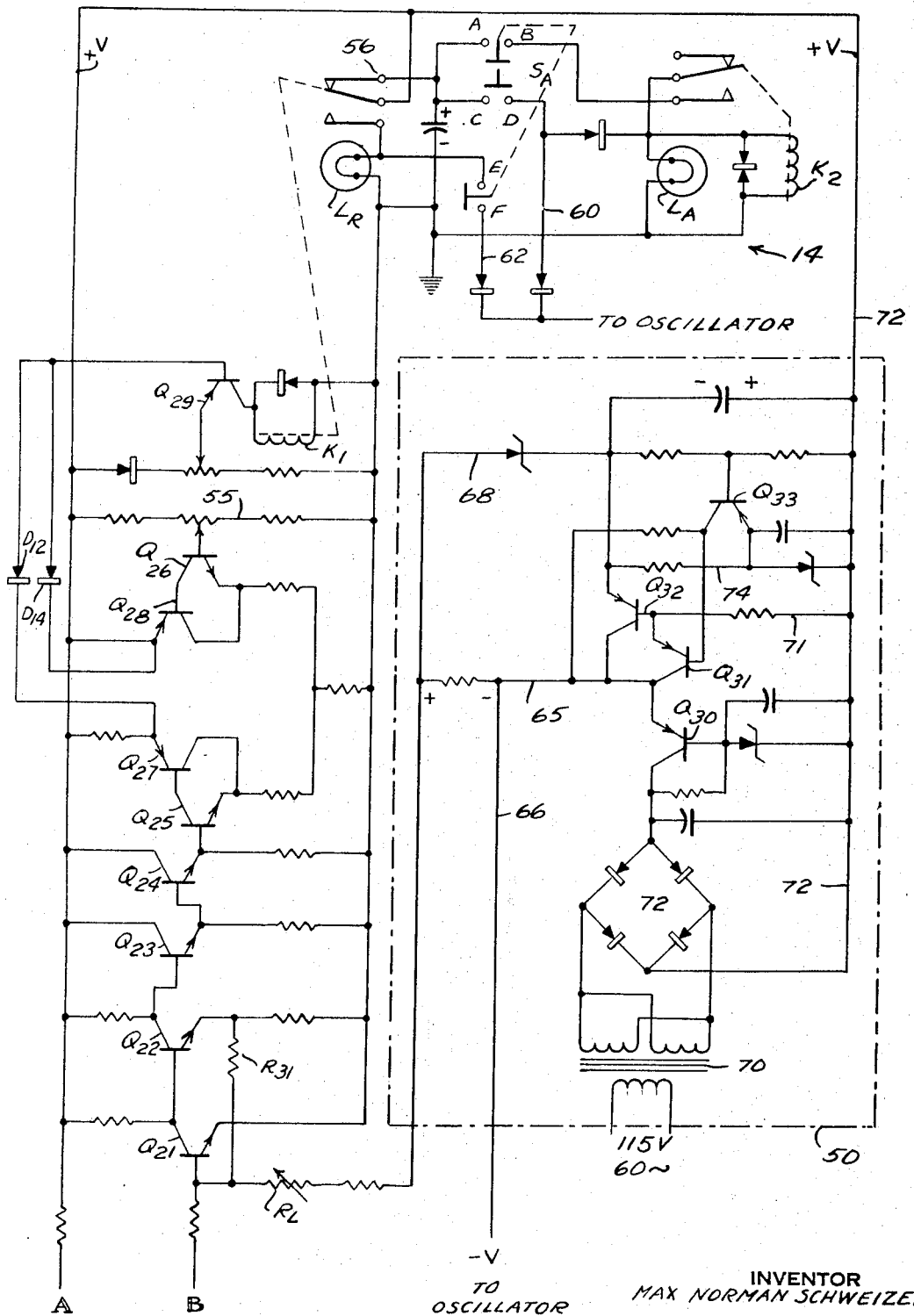

United States Patent Office

3,453,598
Patented July 1, 1969

3,453,598
CREDIT CARD VERIFIER USING TRANSFORMERS
Max Norman Schweizer, Bayshore, N.Y., assignor to Nasco Design Corporation, Lynbrook, N.Y., a corporation of New York
Filed June 3, 1965, Ser. No. 460,975
Int. Cl. H04q 3/02
U.S. Cl. 340—149     6 Claims

ABSTRACT OF THE DISCLOSURE

A credit card verification system consisting of a plurality of primary and secondary transformers having a thin air gap disposed therebetween for receiving a credit card designed to increase the mutual coupling of selected transformers in accordance with a predetermined code. The credit card includes one or more magnetic elements which are hidden under the surface of the card and spaced apart for alignment under selected transformers. The user of the card presents the card to a sales person together with a memorized number which is applied to the card system in order to verify that the hidden elements within the card can reproduce the same number to establish the credit and identity of the customer.

---

This invention relates to digital computing devices and, in particular, to computing devices which generate output signals which are derived from independently operated sensing and circuit actuating components.

The instant device is operable to verify the ownership and identity of credit cards and their holders. To this end the credit card has implanted masked magnetic elements in discrete locations and the device affords indication according to such location. The site of the elements on the card corresponds to a code number preferably of three digits which is arbitrarily assigned to the owner of the card. The operator of the device who wishes to verify the card's ownership uses the number to operate a verification coder in the instrument. The coder operates in conjunction coder in the instrument. The coder operates in conjunction with sensors which receive a card bearing the code in the form of discretely located indicia to generate an integrated signal according to the correlation of the code on the card and that in the verifying coder. This signal is compared in a detector circuit with a reference signal to operate an accept or reject circuit. The latter affords an indication depending on whether there is correspondence or not between the two inputs placed independently in the coder and magnetic sensing sections of the device.

One object of the invention is to provide an improved computer operable to compare input signals and generate a corresponding output.

Another object of the invention is to provide a computer capable of producing an indication corresponding to the presence and location of magnetic indicia inserted in the device.

Other objects and advantages of the invention may be perceived by persons skilled in the art on reading the following complete description of one embodiment thereof which is taken in conjunction with the accompanying drawings, in which:

FIG. 4 is a schematic diagram showing the integrator and accept or reject indicating circuits.

Figure 1:
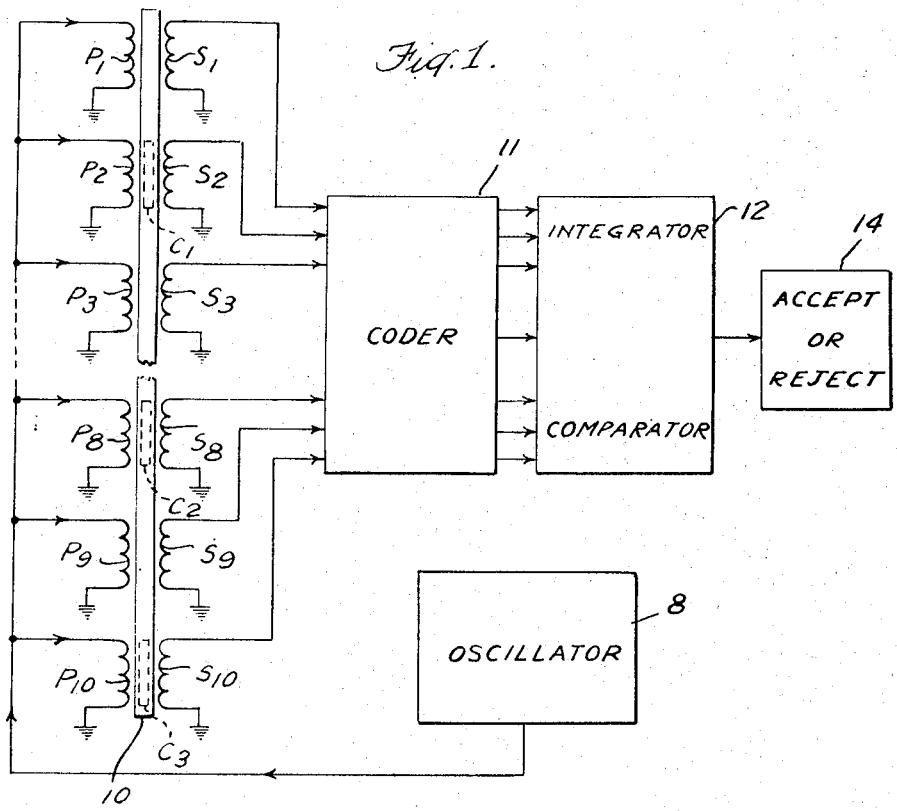
FIG. 1 is a block diagram showing generally the card verifier.
Figure 2:
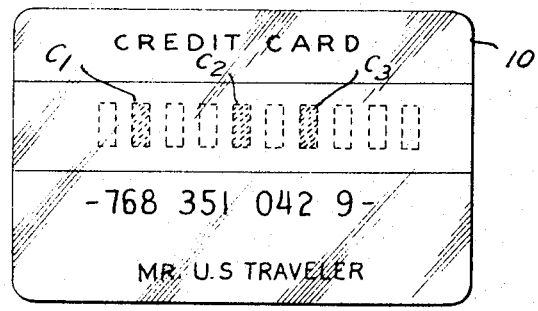
FIG. 2 is an illustration of the card.

Referring to FIG. 1, oscillator 8 is shown to be connected so as to place an A.C. voltage on the primaries $P_1 \ldots P_{10}$ of air gap transformers $T_1 \ldots T_{10}$ which are provided with the usual secondary windings $S_1 \ldots S_{10}$. A credit card 10 is disposed between the primary and secondary windings of all the transformers, the card being laminated and containing within its superficial layers magnetic indicia elements $C_1$, $C_2$ and $C_3$ fabricated, for example, of a ferrite material and discretely located in the gaps of a selected group of transformers. The air gap between the primary and secondary windings of the transformers of FIG. 1 is constructed slightly larger than the thickness of credit card 10 in order to enable the credit card 10 to be easily inserted and removed from between the transformer windings without undue frictional drag. Magnetic elements $C_1$–$C_3$ are shown disposed endwise in an enlarged view between the transformers of FIG. 1 so that the mutual coupling between the transformer windings is significantly increased over those transformers having an air gap between the primary and secondary windings. The presence of elements $C_1$–$C_3$ between the primaries and secondaries of selected transformers significantly increases the induced electrical output at the secondary of said transformers over the secondary of air gap transformers, regardless of whether the elements are placed endwise or longitudinally between the windings since it is not the polarity of the elements, but their magnetic material which substantially increases the mutual coupling between selected transformers. The magnetic elements $C_1$–$C_3$ together with the blanks between the elements contained on card 10 are spaced apart so that each of the blank spaces or magnetic elements is aligned in the air gap space precisely in the path between the primary and secondary of each of the 10 transformers shown in FIG. 1.

The secondary windings are connected to coder 11 having manually operated switches. Transfer of voltage in the transformers and flow of current in the secondary windings will be established if those switches connected to the transformers containing the three magnetic elements on the card are closed by the operator. The signals are then added in the integrator-comparator 12 and compared with an established reference voltage $+V$ in the comparator portion of the circuit. In the event that the comparator is provided with the proper verification voltage a signal is sent to the accept portion of the accept or reject circuit 14. Similarly, if the comparator does not receive the proper signal from the coder the reject portion of the circuit 14 will be energized. The indication to the operator is in the form of light indicators but obviously may be afforded by sound buzzers or other means deemed feasible for the required information transfer.

Figure 3:
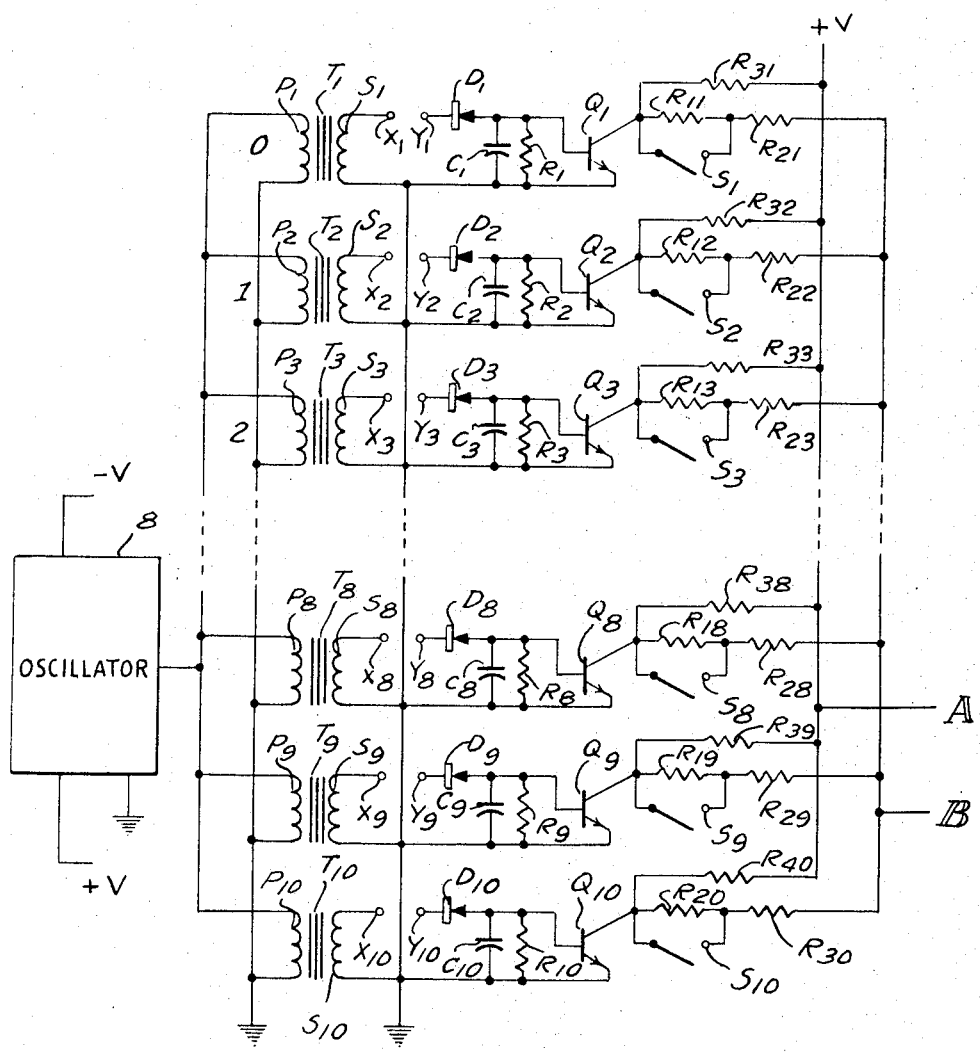
FIG. 3 is a schematic showing in detail the magnetic sensing coder and magnetic comparator devices in the verifier.

As shown in FIG. 3, the oscillator 8 supplies an A.C. signal to the primaries $P_1 \ldots P_{10}$ of the transformers $T_1 \ldots T_{10}$ having secondary windings $S_1 \ldots S_{10}$. The transformers have air gap cores which are adapted to be closed by the magnetic core materials deposited on the card.

The coder section of this device consists of the switches $X_1, Y_1 \ldots X_{10}, Y_{10}$ which are manually depressed and closed by the operator to apply the secondary currents of the transformers containing the core material across diodes $D_1 \ldots D_{10}$, by-pass capacitors $C_1 \ldots C_{10}$ and D.C. resistors $R_1 \ldots R_{10}$ to the base electrodes of transistors $Q_1 \ldots Q_{10}$. The latter supply voltage signals as inputs to a selected group of voltage dropping resistors $R_{11} \ldots R_{20}$ shunted by switches $S_1 \ldots S_{10}$ and to group of integrator output resistors $R_{21} \ldots R_{30}$. Reference voltage $+V$ on line A from source 50 is placed across all of the summing resistors $R_{31} \ldots R_{40}$ of the integrator to be added to the output of the selected group of transistors $Q_1 \ldots Q_{10}$. The resultant voltage is placed on line B which is connected to the comparator section shown in FIG. 4.

The comparator section is supplied a detector biasing voltage $-V$ by the source 50, the voltage being applied to a variable resistor $R_L$ connected to the base of transistor detector $Q_{21}$ which also receives the integrator voltage on line B. The base of a second transistor detector 22 receives the output of the detector 21, the emitter being referenced by the voltage across resistor $R_L$ and resistor $R_{31}$. The collector electrodes of all the transistors in the integrator and indicating circuits are referenced by the $+V$ voltage on line A, their emitters being grounded. The detectors $Q_{21}$ and $Q_{22}$ are activated only when the integrator output exceeds the level presented by the voltage supplied by the resistor $R_L$ which is adjustable according to the number of digits set into the coder and the corresponding number of air gaps selectively required to be closed in the transformers $T_1 \ldots T_{10}$.

Relay driving transistor $Q_{27}$ receives the output of the integrator through high gain amplifier transistors $Q_{23}$, $Q_{24}$ and $Q_{25}$ while relay driving transistor $Q_{28}$ is base energized by transistor 26 and the voltage divider 55 which is connected between line A and ground.

Transistor 29 receives the signal on its base electrode from the transistors $Q_{27}$ and $Q_{28}$ across diodes $D_{12}$ and $D_{14}$ and applies it to the winding of relay $K_1$ the armature of which is mechanically connected to the arm of indicator switch 56 which is electrically connected to the $+V$ source.

The accept or reject circuit 14 is operated by the switch 56 to indicate whether verification is made. To this end reject lamp $L_R$ is connectable to the $+V$ source through the lower contact and the arm of the switch. This is the normal position of the switch and the solenoid of relay $K_1$. However, when the relay is energized, the switch arm is raised to engage the upper contact of the switch 56. On closing switch $S_A$ the source $+V$ is connected to relay $K_{12}$ through terminals C and D and the oscillator is supplied with direct current on lead 60. At the same time current is applied to accept lamp $L_A$ through terminals A and B of the switch $S_A$. In the event no verification is possible the relay $K_1$ is not energized on closing switch $S_A$ to supply current on lead 62 to the oscillator through terminals E and F. The arm will thus engage the lower contact of switch 56 and light the reject lamp $L_R$.

The usual 115 volt 60 cycle source is coupled to the secondary of transformer 70 across which is placed full wave rectifier 72. Transistor $Q_{30}$ is placed across the output of the rectifier and its emitter is connected to the $-V$ voltage lines 65 and 66 leading to the oscillator. Also connected to the voltage line 65 are the collector electrodes of voltage compensating and supplying transistors $Q_{31}$, $Q_{32}$ and $Q_{33}$, the latter having a base connection to $-V$ reference voltage line 68. The emitter of the transistor $Q_{31}$ is connected to the base resistance lead 71 of the transistor $Q_{32}$ and the $+V$ line 72 and its base is connected to the collector of transistor $Q_{33}$. The emitter of transistor $Q_{32}$ is connected to the line 72 through resistance lead 74 to which is also connected the emitter of the transistor $Q_{33}$.

Various modifications of the device including its circuitry may be effected by persons skilled in the art without departing from the scope and principle of invention as defined in the appended claims.

What is claimed is:

1. A card verifier apparatus for receiving cards having a plurality of selectively spaced-apart magnetic elements discretely disposed below the surfaces of the cards comprising:
   a plurality of transformers each having a primary winding and a secondary winding providing an air gap therebetween, said transformers being spaced-apart for alignment with at least one magnetic card element when cards are inserted into said air gap,
   selector means for selectively coupling to each of said secondary windings to verify the location of the card elements, and,
   circuit sensing means coupled to the output of said selector means for indicating a verification of the location of the card elements.

2. The apparatus as recited in claim 1 wherein said selector means comprises a plurality of manually operated switches which are numerically coded in cooperation with a code established for the location of the magnetic elements disposed within the cards.

3. The apparatus as recited in claim 2 wherein said circuit sensing means comprises:
   an oscillator coupled to each of said primary windings for producing an AC signal thereacross,
   detector means coupled to said selector means output for detecting the induced signal of said secondary windings, and
   comparator means coupled to the output of said detector means for providing verification of the location of said card elements with respect to a predetermined code selected on said switches.

4. The apparatus as recited in claim 3 wherein said comparator means comprises:
   a reference signal source for providing a signal having a fixed magnitude,
   an integrator coupled to said detector means for summing the output thereof, and,
   a comparator circuit having its input coupled to said integrator and said reference signal for providing an indication when the magnitude of said integrator signal exceeds the magnitude of said reference signal.

5. The apparatus as recited in claim 4, wherein said circuit sensing means additionally comprises an indicator lamp connected to the output of said comparator circuit.

6. The apparatus as recited in claim 5 wherein said reference signal source additionally comprises an adjustable means for varying the threshold signal at the input of said comparator circuit so that said sensing means is adjustably responsive to a predetermined number of magnetic elements disposed on the cards.

References Cited

UNITED STATES PATENTS

| | | |
|---|---|---|
| 2,634,911 | 4/1953 | Wolowitz. |
| 3,100,834 | 8/1963 | Demer. |
| 3,105,154 | 9/1963 | Barber _____ 340—149 X |
| 3,160,867 | 12/1964 | Fitzgerald _____ 340—149 X |
| 3,184,714 | 5/1965 | Brown et al. |
| 3,299,298 | 1/1967 | Schinner. |

MAYNARD R. WILBUR, *Primary Examiner.*

R. M. KILGORE, *Assistant Examiner.*

U.S. Cl. X.R.

235—61.11; 61.12